United States Patent
Guo et al.

(10) Patent No.: US 7,759,826 B1
(45) Date of Patent: Jul. 20, 2010

(54) SMART CONNECTOR WAKEUP AND SLEEP CONTROL

(75) Inventors: Sam Yonghong Guo, Canton, MI (US); Xiaopeng Weng, Canton, MI (US); Ronald Jeffrey Tejero, Farmington Hills, MI (US)

(73) Assignee: Yazaki North America, Inc., Canton, MI (US)

(*) Notice: Subject to any disclaimer, the term of this patent is extended or adjusted under 35 U.S.C. 154(b) by 177 days.

(21) Appl. No.: 12/195,013

(22) Filed: Aug. 20, 2008

(51) Int. Cl.
*H01H 9/54* (2006.01)
(52) U.S. Cl. .................................... 307/140
(58) Field of Classification Search ................ 307/140
See application file for complete search history.

(56) References Cited

U.S. PATENT DOCUMENTS

| | | | |
|---|---|---|---|
| 4,970,623 A | 11/1990 | Pintar | |
| 5,654,593 A | 8/1997 | Murata | |
| 6,222,285 B1 | 4/2001 | Haley et al. | |
| 6,509,708 B2 * | 1/2003 | Cho et al. | 318/599 |
| 6,914,980 B2 | 7/2005 | Liu | |
| 7,099,162 B2 | 8/2006 | Lin et al. | |

* cited by examiner

*Primary Examiner*—Robert L. Deberadinis
(74) *Attorney, Agent, or Firm*—Harness, Dickey & Pierce, P.L.C.

(57) ABSTRACT

A connector state control module includes a sensing module that determines a state of a pulse width modulation (PWM) signal. A charge switching module selectively provides a voltage based on the state of the PWM signal. A charge storage module stores a charge based on the voltage. A power supply switching module selectively outputs a power signal based on the charge.

20 Claims, 3 Drawing Sheets

US 7,759,826 B1

SMART CONNECTOR WAKEUP AND SLEEP CONTROL

FIELD

The present disclosure relates to wakeup and sleep control of a smart connector.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A controller may control electrical and/or electromechanical devices according to a power signal and one or more control signals. For example, the controller may receive the power signal and the control signals and control the devices including, but not limited to, a vehicle fuel pump, a vehicle ignition system, a vehicle braking system, and a valve control system.

The controller may receive the signals via a connector such as a smart connector. The controller and/or the connector may communicate with a power source such as a vehicle battery. When the controller is not in use, the connector may still be in communication with the vehicle battery. Consequently, the vehicle battery may continue to provide a small amount of current to the controller via the connector. Typically, a smart connector includes a microcontroller or other control device that actively determines when to turn off the connector and interrupt power delivered to the controller. Alternatively, the connector may include a separate pin that receives an on/off signal. The connector determines when to interrupt power delivered to the controller based on the on/off signal.

SUMMARY

A connector state control module includes a sensing module that determines a state of a pulse width modulation (PWM) signal. A charge switching module selectively provides a voltage based on the state of the PWM signal. A charge storage module stores a charge based on the voltage. A power supply switching module selectively outputs a power signal based on the charge.

A method for operating a connector state control module includes determining a state of a pulse width modulation (PWM) signal, selectively providing a voltage based on the state of the PWM signal, storing a charge based on the voltage, and selectively outputting a power signal based on the charge.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
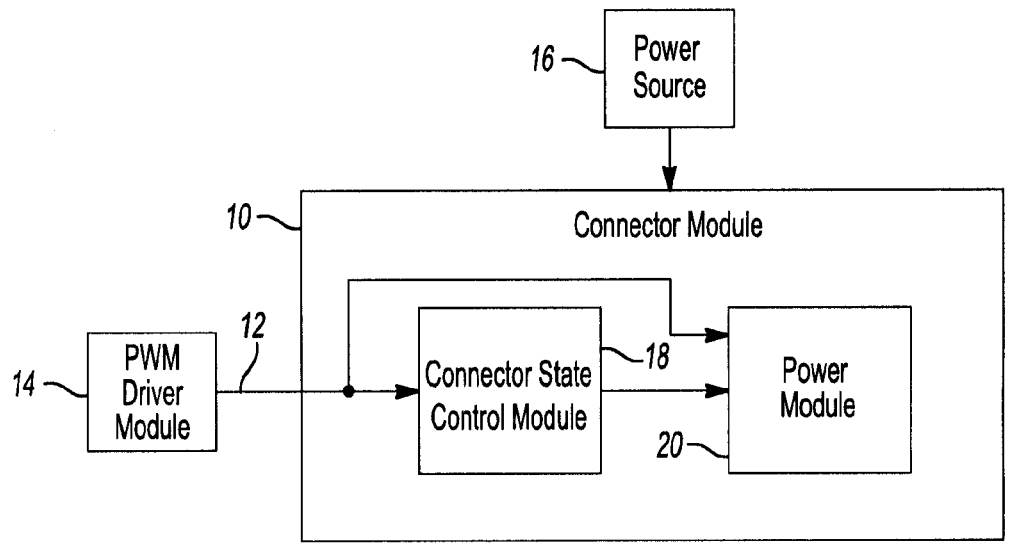
FIG. 1 is a functional block diagram of a connector module according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A wakeup and sleep control system of the present disclosure transitions a smart connector between on and off (i.e. awake and sleep) states without the use of a microcontroller and/or a dedicated on/off pin. The wakeup and sleep control system senses a pulse width modulation (PWM) signal to determine when to transition the smart connector between the on and off states. For example, the wakeup and sleep control system may maintain the smart connector in the on state when the PWM signal is input to the smart connector and automatically transition the smart connector to the off state when the PWM signal is not input to the smart connector.

Referring now to FIG. 1, a connector module (e.g. a smart connector) 10 is shown. The connector module 10 receives a PWM signal 12 from a PWM driver module 14. For example, the PWM signal 12 controls various functions of the connector module 10. The connector module 10 may also receive power from a power source 16. For example, the power source 16 may include a vehicle battery that provides a voltage to the connector module 10.

The connector module 10 includes a connector state control module 18 and a power module 20. The connector state control module 18 and the power module 20 each communicate with the PWM signal 12. For example, the power module 20 may include circuitry that provides power to control various circuits and functions (not shown) of the connector module 10 based on the PWM signal 12.

The connector state control module 18 controls states of the power module 20, and consequently the connector module 10, based on the PWM signal 12. More specifically, the connector state control module 18 determines whether the PWM signal 12 is active and controls the states of the power module 20 accordingly. For example, when the connector state control module 18 determines that the PWM signal 12 is active, the connector state control module 18 maintains the power module 20 in an awake (i.e. "on") state. Conversely, when the connector state control module 18 determines that the PWM signal 12 is inactive, the connector state control module 18 transitions the power module 20 to a sleep (i.e. "off") state.

Figure 2:
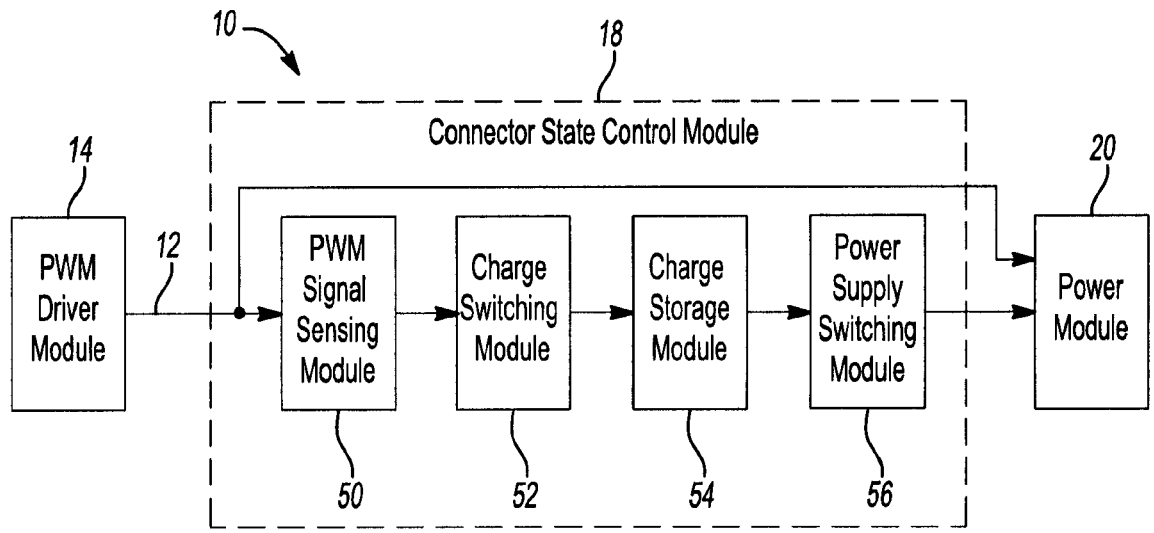
FIG. 2 is a functional block diagram of a connector state control module according to the present disclosure.

Referring now to FIG. 2, the connector state control module 18 includes a PWM signal sensing module 50, a charge switching module 52, a charge storage module 54, and a power supply switching module 56. The PWM signal sensing module 50 receives the PWM signal 12 from the PWM driver module 14 and determines whether the PWM signal 12 is active or inactive. The PWM signal sensing module 50 controls switching of the charge switching module 52 based on the PWM signal 12. For example, when the PWM signal 12 is active, the PWM signal sensing module 50 turns on the charge switching module 52. Conversely, when the PWM signal 12 is inactive, the PWM signal sensing module 50 turns off the charge switching module 52.

Accordingly, the charge switching module 52 is either on or off based on whether the PWM signal 12 is active or inactive. When the PWM signal 12 is active, the charge switching module 52 is on and charges the charge storage module 54. For example, the charge switching module 52 may communicate with the power source 16 to receive a vehicle battery voltage. When the charge switching module 52 is on, the voltage charges the charge storage module 54. When the charge switching module 52 is off, the charge switching module 52 interrupts communication between the power source 16 and the charge storage module 54. Consequently, the charge storage module 54 is discharged.

A state of the charge storage module 54 (i.e. charged or discharged) controls a state of the power supply switching module 56. For example, the charge storage module 54 may provide a voltage to the power supply switching module 56. Accordingly, when the charge storage module 54 is charged, the power supply switching module 56 is on. When the charge storage module 54 is discharged, the power supply switching module 56 does not receive the voltage and is off.

The power supply switching module 56 communicates with the charge storage module 54 to provide power to the power module 20. For example, when the power supply switching module 56 is on, the power module 20 is on. The power module 20 operates according to the PWM signal 12. Conversely, when the power supply switching module 56 is off, the power module 20 is off.

Figure 3:
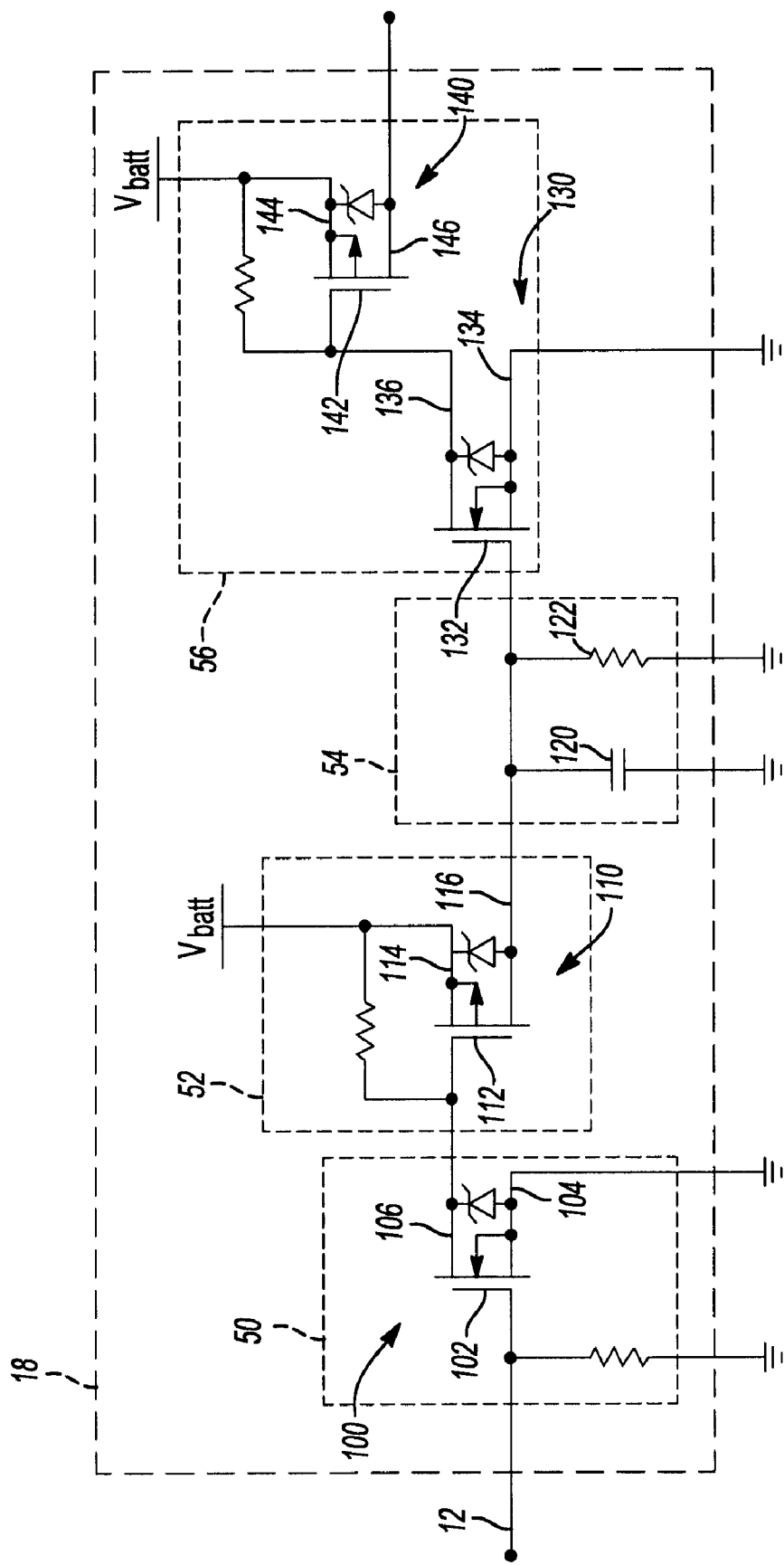
FIG. 3 is a functional block diagram of a connector state control module shown in more detail according to the present disclosure.

Referring now to FIG. 3, the PWM signal sensing module 50, the charge switching module 52, the charge storage module 54, and the power supply switching module 56 are shown in further detail. The PWM signal sensing module 50 includes a transistor 100. For example only, the transistor 100 may include an N-channel MOSFET. The transistor 100 includes a gate 102, a source 104, and a drain 106. The gate 102 communicates with the PWM signal 12. The source 104 communicates with a reference potential (e.g. ground). When a voltage at the gate 102 is greater than a voltage at the source 104, the transistor 100 is on. Consequently, when the PWM signal 12 is active, the transistor 100 transitions on and off according to the PWM signal 12. When the PWM signal 12 is inactive, the transistor 100 remains off.

Accordingly, the drain 106 outputs a signal (e.g. a voltage) that is dependent upon whether the PWM signal 12 is active or inactive. For example, the signal may have first and second states (high and low, respectively) that correspond to active and inactive states of the PWM signal 12. When the transistor 100 is on, the signal output from the drain 106 may be high, and when the transistor 100 is off, the signal is low. In other words, the PWM signal sensing module 50 selectively outputs a high or low signal based on the state of the PWM signal 12 at the gate 102 of the transistor 100.

The charge switching module 52 includes a transistor 110. For example only, the transistor 110 may include a P-channel MOSFET. The transistor 110 includes a gate 112, a source 114, and a drain 116. The gate 112 communicates with the drain 106 of the transistor 100. The source 114 communicates with a voltage such as a vehicle battery voltage Vbatt. When a voltage at the gate 112 is lower than a voltage at the source 114, the transistor 100 is on. When the drain 106 outputs a high signal (i.e. the transistor 100 is on), the transistor 110 is on. When the drain 106 outputs a low signal (i.e. the transistor 100 is off), the transistor 110 is off.

Accordingly, when the transistor 110 is on, the drain 116 outputs the voltage Vbatt through an on resistance of the transistor 110, providing a charging voltage to the charge storage module 54. When the transistor 110 is off, the drain 116 does not provide the charging voltage. In other words, the charge switching module 52 selectively charges charge storage module 54 based on the state of the PWM signal 12 at the gate 112 of the transistor 110.

The charge storage module 54 includes a capacitor 120 and an optional delay resistor 122. The capacitor 120 communicates with the drain 116 of the transistor 110 to receive the charging voltage. When the PWM signal 12 is active and the transistor 110 is on, the capacitor 120 is charged. The capacitor 120 provides a voltage to the power supply switching module 56 when charged. When the PWM signal 12 transitions momentarily to a low state while active, the capacitor 120 holds the charge and continues to provide the voltage to the power supply switching module 56 until the PWM signal 12 transitions to a high state. In other words, transitioning of the PWM signal 12 during the active state does not prevent the capacitor 120 from providing the voltage to the power supply switching module 56.

When the PWM signal 12 is inactive and the transistor 110 is off, the capacitor 120 does not receive the voltage Vbatt and is discharged. For example, capacitor 120 discharges according to a sleep delay time (e.g. time constant C*R, where C is a capacitance of the capacitor 120 and R is a resistance of the delay resistor 122). Corresponding values of the capacitor 120 and the delay resistor 122 can be varied to vary the sleep delay time. Conversely, when the PWM signal 12 returns to an active state, the capacitor 120 charges according to a wakeup delay time (e.g. time charge constant $C*R_{on}$, where $R_{on}$ is the on resistance of the transistor 110). For example only, due to a very low on resistance of the transistor 110 (e.g. less than 1Ω), the wakeup delay time may be approximately 1 μs.

The power supply switching module 56 includes a transistor 130 that includes a gate 132, a source 134, and a drain 136, and a transistor 140 that includes a gate 142, a source 144, and a drain 146. The gate 132 communicates with the charge storage module 154 to receive the voltage of the capacitor 120. When the PWM signal 12 is active and high, the capacitor 120 is charged and the transistor 130 is on. When the PWM signal 12 is active and low, the capacitor 120 remains charged and the transistor 130 remains on. When the PWM signal 12 is inactive, the capacitor 120 discharges (e.g. according to the sleep delay time) and the transistor 130 turns off.

Accordingly, the transistor 140 is off when the transistor 130 is off. For example, the gate 142 communicates with the drain 136. The source 144 communicates with the battery voltage Vbatt to provide power (e.g. to the power module 20). The transistor 140 transitions on and off based on the PWM signal 12 and the charge of the capacitor 120 provided to the gate 132. Accordingly, the power supply switching module 156 is on when the capacitor 120 is charged, and is off when the capacitor 120 is discharged, and generates a signal to turn the power module 20 on and off accordingly. For example, when the power supply switching module 156 is on, the drain 146 provides power to the power module 20. Conversely, when the power supply switching module 156 is off, the drain 146 does not provide power to the power module 20, which turns off the power module 20.

As described above with respect to FIGS. 1-3, the connector state control module 18 transitions the connector module 10 between awake and sleep states based on the state of the PWM signal 12 and the charge state of the charge storage module 54. More specifically, the connector state control module 18 transitions the connector module 10 to a sleep state when the PWM signal 12 is inactive and the charge storage module 54 is charged. Conversely, when the PWM signal 12 is active, the connector state control module 18 charges the charge storage module 54 and transitions the connector module 10 to the awake state.

Further, the connector state control module 18 transitions the connector module 10 between the awake and sleep states without the use of a microcontroller or a separate, dedicated pin that receives an on/off signal. Instead, the connector state control module 18 determines whether to operate in the awake or sleep state based on the PWM signal 12.

Figure 4:
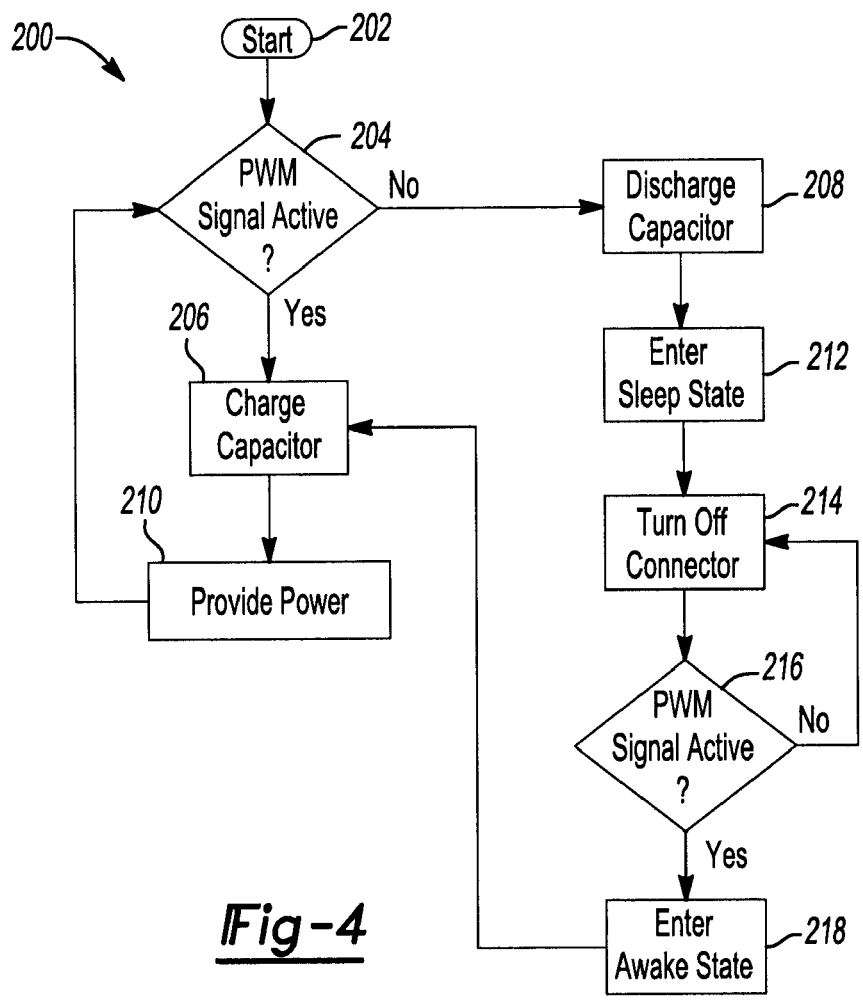
FIG. 4 is a flow diagram illustrating steps of a method for operating a wakeup and sleep control system according to the present disclosure.

Referring now to FIG. 4, a method 200 for operating a wakeup and sleep control system according to the present disclosure begins in step 202. In step 204, the method 200 determines whether the PWM signal 12 is active. If true, the method 200 continues to step 206. In false, the method 200 continues to step 208. In step 206, the method 200 charges the capacitor 120. In step 210, the method 200 continues to provide power to the connector module 10.

In step 208, the method 200 discharges the capacitor 120. In step 212, the method 200 enters a sleep state after a sleep delay time. In step 214, the method 200 turns off the connector module 10. In step 216, the method 200 determines whether the PWM signal 12 is active. If true, the method 200 continues to step 218. In false, the method 200 continues to step 214. In step 218, the method 200 enters an awake state after a wakeup delay time and continues to step 206.

Figure 5:
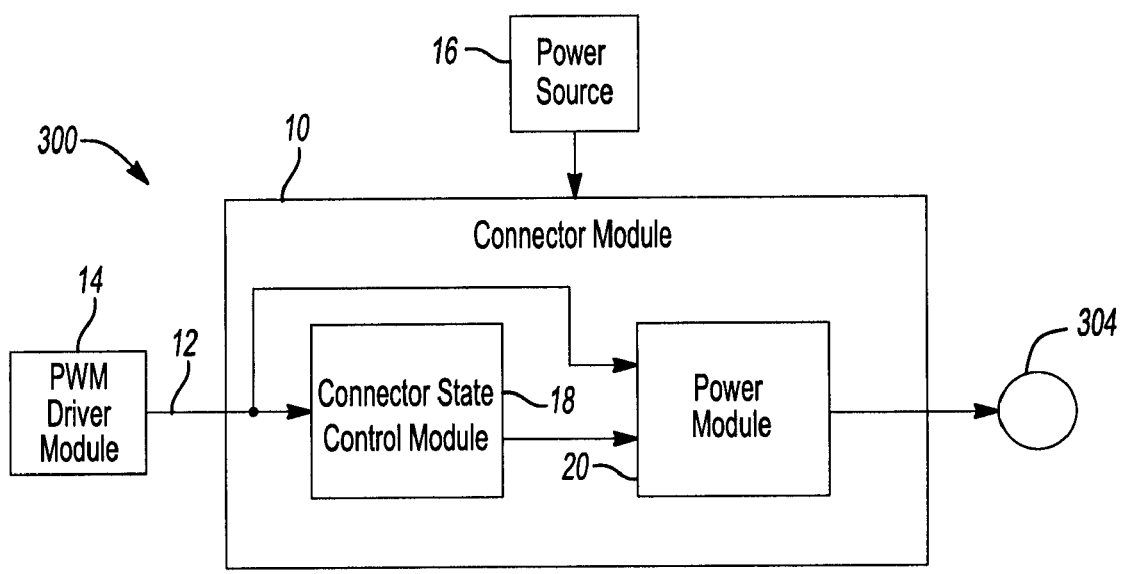
FIG. 5 is a functional block diagram of a fuel pump control system that includes a connector module according to the present disclosure.

Referring now to FIG. 5, a fuel pump control system 300 is shown. The fuel pump control system 300 includes the connector module 10 of the present disclosure. The power module 20 may control a fuel pump motor 304 for a fuel pump (not shown) that provides fuel to a vehicle. For example, the vehicle may include a vehicle and/or a hybrid electric vehicle that includes an internal combustion engine. The connector module 10 as described above in FIGS. 1-4 selectively provides the PWM signal 12 and power to the fuel pump motor 304. For example, the power module 20 may control the fuel pump motor 304 according to the PWM signal 12. Although the connector module 10 is shown in communication with the fuel pump motor 304 in the present exemplary embodiment, those skilled in the art can appreciate that the connector module 10 of the present disclosure may be implemented in other embodiments, including other control systems of a vehicle.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A connector state control module comprising:
    a sensing module that determines a state of a pulse width modulation (PWM) signal;
    a charge switching module that selectively provides a voltage based on the state of the PWM signal;
    a charge storage module that stores a charge based on the voltage; and
    a power supply switching module that selectively provides a power signal based on the charge.

2. The connector state control module of claim 1 wherein the connector state control module is in an awake state when the PWM signal is in an active state and is in a sleep state when the PWM signal is in an inactive state.

3. The connector state control module of claim 2 wherein the power supply switching module outputs the power signal during the awake state and does not output the power signal during the sleep state.

4. The connector state control module of claim 2 wherein the charge storage module receives the voltage and is charged when the PWM signal is in an active state and does not receive the voltage and is discharged when the PWM signal is in an inactive state.

5. The connector state control module of claim 4 wherein the charge storage module includes a capacitor.

6. The connector state control module of claim 5 wherein the connector state transitions to the awake state based on an awake delay time and transitions to the sleep state based on a sleep delay time, and wherein the awake delay time and the sleep delay time are based on a capacitance value of the capacitor.

7. The connector state control module of claim 6 wherein the charge storage module includes a resistor, and the sleep delay time is further based on a resistance value of the resistor.

8. The connector state control module of claim 1 wherein the sensing module includes a transistor that receives the PWM signal and that transitions between on and off states based on the state of the PWM signal.

9. The connector state control module of claim 1 wherein the charge switching module includes a transistor that receives the PWM signal, that transitions between on and off states based on the state of the PWM signal, that provides the voltage to the charge storage module in the on state, and that does not provide the voltage to the charge storage module in the off state.

10. The connector state control module of claim 1 wherein the power supply switching module includes first and second transistors, the first transistor transitions between on and off states based on the charge, and the second transistor selectively outputs the power signal based on the on and off states of the first transistor.

11. A method for operating a connector state control module comprising:
    determining a state of a pulse width modulation (PWM) signal;
    selectively providing a voltage based on the state of the PWM signal;
    storing a charge based on the voltage; and
    selectively outputting a power signal based on the charge.

12. The method of claim 11 further comprising operating in an awake state when the PWM signal is in an active state and operating in a sleep state when the PWM signal is in an inactive state.

13. The method of claim 12 further comprising outputting the power signal during the awake state and not outputting the power signal during the sleep state.

14. The method of claim 12 further comprising:
   storing the charge when the PWM signal is in an active state; and
   dissipating the charge when the PWM signal is in an inactive state.

15. The method of claim 14 wherein storing the charge includes storing the charge at a capacitor.

16. The method of claim 15 further comprising transitioning to the awake state based on a charging time and transitioning to the sleep state based on a discharging time, wherein the awake delay time and the sleep delay time are based on a capacitance value of the capacitor.

17. The method of claim 16 wherein the sleep delay time is further based on a resistance value of a resistor.

18. The method of claim 11 wherein the determining the state of the PWM signal includes:
   receiving the PWM signal at a transistor; and transitioning the transistor between on and off states based on the state of the PWM signal.

19. The method of claim 11 wherein the selectively providing the voltage based on the state of the PWM signal includes:
   receiving the PWM signal at a transistor;
   transitioning the transistor between on and off states based on the state of the PWM signal;
   providing the voltage when the transistor is in the on state; and
   not providing the voltage when the transistor is in the off state.

20. The method of claim 11 wherein the selectively outputting the PWM signal based on the charge includes:
   transitioning a first transistor between on and off states based on the charge; and
   selectively outputting the power signal from a second transistor based on the on and off states of the first transistor.

* * * * *